United States Patent
Yang et al.

(10) Patent No.: US 12,469,952 B2
(45) Date of Patent: Nov. 11, 2025

(54) ELECTRONIC DEVICE AND DISPLAY APPARATUS

(71) Applicant: VIVO MOBILE COMMUNICATION CO., LTD., Dongguan (CN)

(72) Inventors: Hao Yang, Dongguan (CN); Jincai Duan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 173 days.

(21) Appl. No.: 18/227,301

(22) Filed: Jul. 27, 2023

(65) Prior Publication Data

US 2023/0369742 A1     Nov. 16, 2023

Related U.S. Application Data

(63) Continuation of application No. PCT/CN2022/073468, filed on Jan. 24, 2022.

(30) Foreign Application Priority Data

Jan. 28, 2021    (CN) .................. 202110121427.7

(51) Int. Cl.
*H01Q 1/22*     (2006.01)
*F21V 8/00*     (2006.01)
(Continued)

(52) U.S. Cl.
CPC .............. *H01Q 1/22* (2013.01); *G02B 6/0025* (2013.01); *G02B 6/0031* (2013.01);
(Continued)

(58) Field of Classification Search
CPC .......... H01Q 1/22; H01Q 1/38; G02B 6/0025; G02B 6/0031; G02B 6/0083;
(Continued)

(56) References Cited

U.S. PATENT DOCUMENTS 10,116,055 B2 * 10/2018 Zhao ................... H04B 5/73
2012/0133597 A1   5/2012 Chen
(Continued)

FOREIGN PATENT DOCUMENTS

CN     101515087 A    8/2009
CN     110082976 A    8/2019
(Continued)

OTHER PUBLICATIONS

Liu et al. (English translation of CN 111399286 (Year: 2020).*
(Continued)

*Primary Examiner* — Seung H Lee
(74) *Attorney, Agent, or Firm* — IPX PLLC

(57) ABSTRACT

An electronic device and a display apparatus are disclosed. The display apparatus includes a Near Field Communication (NFC) module and a backlight module. The NFC module includes an NFC coil and an NFC ferrite. The backlight module includes a first insulation layer and a brightening layer that are superposed sequentially. The NFC coil is disposed on the brightening layer and is in the first insulation layer. The NFC ferrite is disposed on a side of the first insulation layer away from the brightening layer.

20 Claims, 3 Drawing Sheets

(51) Int. Cl.
*H01Q 1/38* (2006.01)
*H04B 5/26* (2024.01)

(52) U.S. Cl.
CPC ......... *G02B 6/0083* (2013.01); *G02B 6/0091* (2013.01); *H01Q 1/38* (2013.01); *H04B 5/26* (2024.01)

(58) Field of Classification Search
CPC .......... G02B 6/0091; H04B 5/26; H04B 5/77; Y02D 30/70; G09F 9/30; H04W 4/80
See application file for complete search history.

(56) References Cited

U.S. PATENT DOCUMENTS

| | | | |
|---|---|---|---|
| 2014/0080411 A1 | 3/2014 | Konanur et al. | |
| 2014/0146004 A1 | 5/2014 | Jang et al. | |

FOREIGN PATENT DOCUMENTS

| | | |
|---|---|---|
| CN | 110718739 A | 1/2020 |
| CN | 111399286 A | 7/2020 |
| CN | 111413815 A | 7/2020 |
| CN | 111508340 A | 8/2020 |
| CN | 112927614 A | 6/2021 |
| CN | 112927616 A | 6/2021 |
| CN | 112927617 A | 6/2021 |
| CN | 112927620 A | 6/2021 |

OTHER PUBLICATIONS

International Search Report issued in corresponding International Application No. PCT/CN2022/073468, mailed Apr. 8, 2022, 6 pages.

First Office Action issued in related Chinese Application No. 202110121427.7, mailed Jul. 5, 2022, 9 pages.

* cited by examiner

View in an M-M direction

ELECTRONIC DEVICE AND DISPLAY APPARATUS

CROSS-REFERENCE TO RELATED APPLICATIONS

This application is a continuation of International Application No. PCT/CN2022/073468, filed Jan. 24, 2022, which claims priority to Chinese Patent Application No. 202110121427.7, filed Jan. 28, 2021. The entire contents of each of the above-referenced applications are expressly incorporated herein by reference.

TECHNICAL FIELD

This application relates to the field of electronic devices, and in particular, to an electronic device and a display apparatus.

BACKGROUND

With the increase of user demands, an electronic device has an increasingly large quantity of functional modules. These functional modules enable the electronic device to play an increasingly large quantity of functions, thereby meeting more usage demands of users.

In the related art, an electronic device is provided with a Near Field Communication (NFC) module. The NFC module can endow the electronic device with a near field communication function. In this case, the electronic device can be used for payment, motion monitoring, access control enabling, and the like. Obviously, this may further expand application scenarios of the electronic device.

In the related art, the electronic device is provided with a display module. The NFC module is attached to a back surface (namely, a surface opposite to a display surface of the display module) of the display module, so that superposed mounting of the NFC module and the display module is implemented. However, such a mounting structure increases a thickness of the electronic device. As a result, a development demand for a thinner electronic device cannot be met.

SUMMARY

Embodiments of this application provide a display apparatus.

According to one aspect, this application discloses a display apparatus, including an NFC module and a backlight module. The NFC module includes an NFC coil and an NFC ferrite. The backlight module includes a first insulation layer and a brightening layer that are superposed sequentially. The NFC coil is disposed on the brightening layer and is in the first insulation layer.

According to another aspect, this application discloses an electronic device, including the foregoing display apparatus. According to this application, a structure of a display apparatus is optimized in such a manner that an NFC coil is disposed on a brightening layer and is within a first insulation layer, so that an NFC module can be embedded in a backlight module. This avoids occupation of superposing space of the display apparatus by the NFC module, and decreases a thickness of the display apparatus, thereby facilitating design of a thinner electronic device.

BRIEF DESCRIPTION OF DRAWINGS

The accompanying drawings described herein are intended to provide further understanding of this application, and constitute a part of this application. Example embodiments of this application and descriptions thereof are intended to describe this application, but do not constitute inappropriate limitations to this application. In the accompanying drawings.

DETAILED DESCRIPTION

To make the objectives, technical solutions, and advantages of this application clearer, the following describes the technical solutions of this application with reference to the specific embodiments of this application and the corresponding accompanying drawings. Apparently, the described embodiments are merely some rather than all of embodiments of this application. All other embodiments obtained by a person of ordinary skill in the art based on embodiments of this application without creative efforts shall fall within the protection scope of this application.

Figure 3:
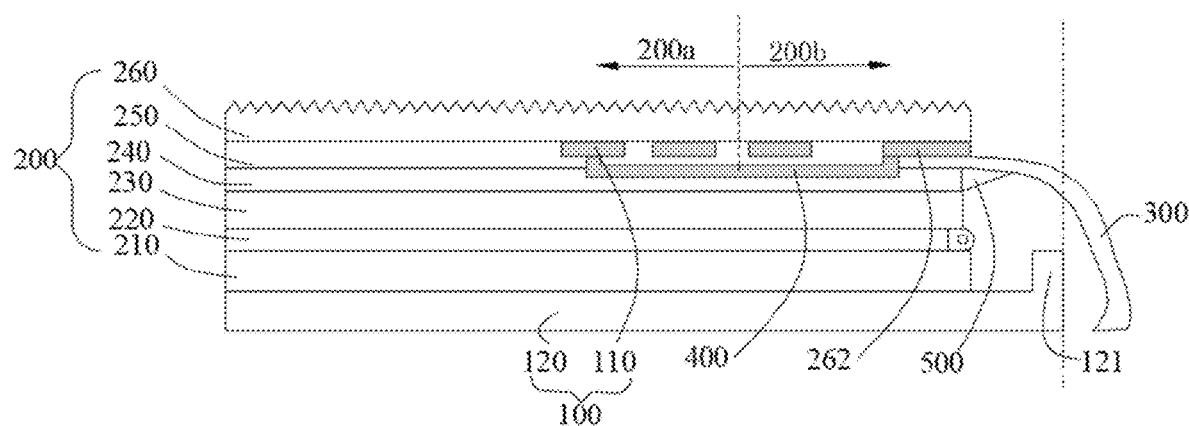
FIG. 3 is a sectional view in an M-M direction in FIG. 1 according to an embodiment of this application.

As shown in FIG. 3, a display apparatus disclosed in this application includes an NFC module 100 and a backlight module 200. The NFC module 100 includes an NFC coil 110 and an NFC ferrite 120. The backlight module 200 includes a first insulation layer 250 and a brightening layer 260 that are superposed sequentially. Backlight emitted by the backlight module 200 passes through the first insulation layer 250 and the brightening layer 260 sequentially, and is emitted from the brightening layer 260. The NFC coil 110 is disposed on the brightening layer 260 and is in the first insulation layer 250. The NFC ferrite 120 is disposed on a side of the first insulation layer 250 away from the brightening layer 260.

The display apparatus disclosed in this embodiment of this application includes a display. The display is superposed on the backlight module 200, and plays a display function under the action of the backlight provided by the backlight module 200.

In this application, brightness of the backlight can be increased after the backlight is processed by the brightening layer 260, so that a light-emitting effect of the backlight module 200 is enhanced. The first insulation layer 250 provides insulated protection for the NFC module 100, thereby protecting the NFC module 100 against a short circuit.

The NFC module 100 is configured to play an NFC function. In a specific working process, the NFC ferrite 120 bunches magnetic flux, to effectively enlarge an induction distance by increasing magnetic field intensity. The NFC coil 110 is configured to generate an NFC signal. According to this application, the NFC coil 110 is disposed on the brightening layer 260 and is embedded in the first insulation layer 250, so that the NFC coil 110 does not need to occupy superposing space independently. Therefore, occupation of superposing space of the backlight module 200 by the NFC module 100 is avoided. This can effectively decrease a thickness of the display apparatus in this application. Test data statistics show that when a design manner, of this application, in which the NFC module 100 and the backlight module 200 are adapted to each other is used, the thickness of the display apparatus is decreased by about 300 μm. This is conducive to thinning development of the display apparatus, thereby facilitating design of a thinner electronic device.

A process of assembling the display apparatus in this application may be implemented as follows: First, the NFC coil 110 is attached to the brightening layer 260 via evaporation; and then, the first insulation layer 250 is superposed on the brightening layer 260 via vapor deposition, where the NFC coil 110 is in the first insulation layer 250. The materials of the NFC coil 110 may be transparent Indium Tin Oxide (ITO), nano silver, TiAlTi, and the like. As an alternative technological means, ITO and TiAlTi may be disposed on the brightening layer 260 via magnetron sputtering, but the nano silver may be disposed on the brightening layer 260 according to a liquid smearing method.

Figure 1:
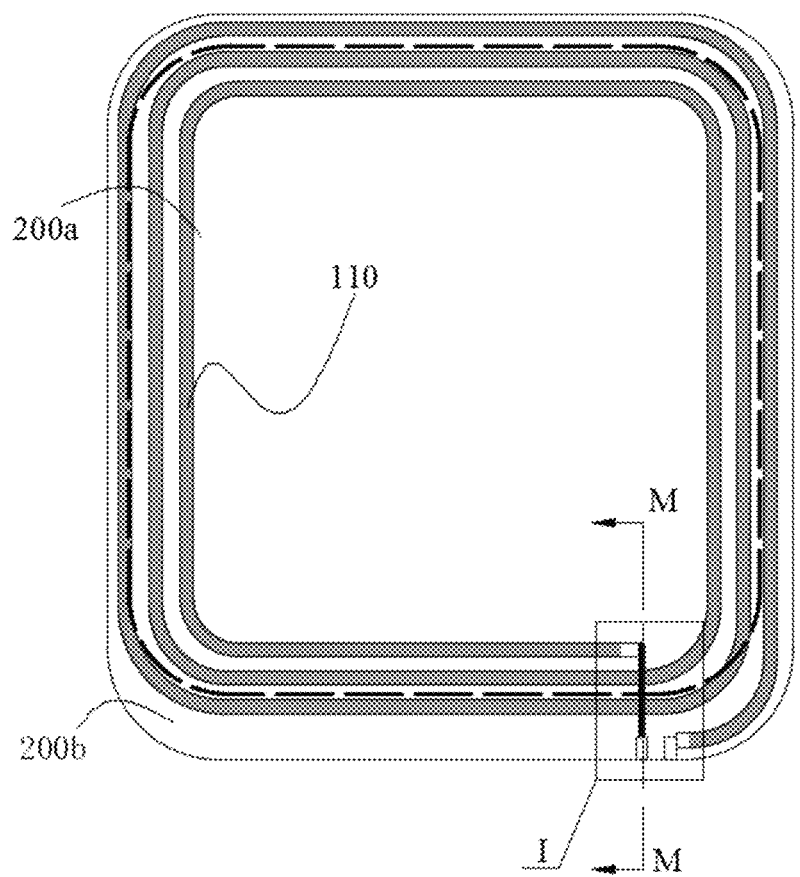
FIG. 1 is a layout diagram of an NFC module in a display apparatus according to an embodiment of this application.

In some implementations, as shown in FIG. 1 and FIG. 3, the NFC coil 110 extends along an edge of the backlight module 200 and forms a plurality of circles; the backlight module 200 includes a display region 200a and a non-display region 200b; the non-display region 200b is disposed around the display region 200a; one portion of the NFC coil 110 is disposed in the display region 200a; and the other portion of the NFC coil 110 is disposed in the non-display region 200b.

In some implementations, the NFC coil 110 is transparent wire, to further increase a screen-to-body ratio. In addition, an evaporation process is used for the NFC coil 110, so that a proportion of a transparent metal ingredient can be adjusted flexibly, thereby adapting to different working scenarios.

Figure 2:
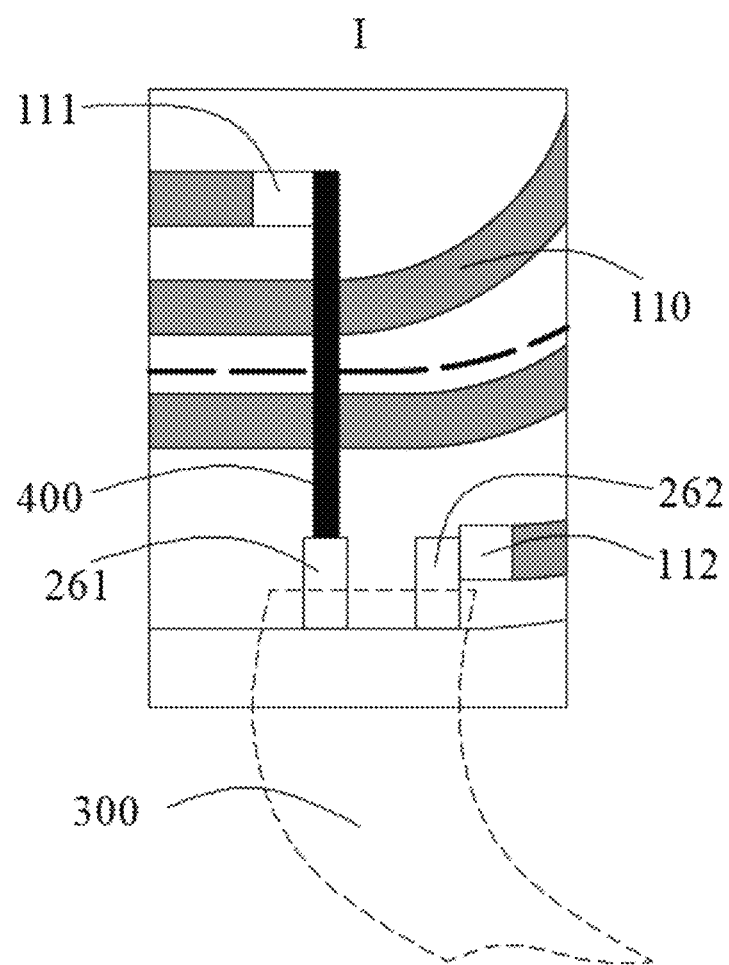
FIG. 2 is an enlarged view of a position I in FIG. 1 according to an embodiment of this application.

In some embodiments, as shown in FIG. 1 and FIG. 2, the NFC coil 110 includes a first coil end 111 near a center of the backlight module 200 and a second coil end 112 near an edge of the backlight module 200; the display apparatus further includes a first flexible printed circuit board 300;

a first end of the first flexible printed circuit board 300 is connected to the edge of the backlight module 200 and is electrically connected to the second coil end 112; and the first coil end 111 is electrically connected to the first flexible printed circuit board 300 through bridging wire 400.

Due to design of the first flexible printed circuit board 300, an NFC signal generated by the NFC module 100 can be transmitted to an external chip, to implement signal transmission. Due to a layout manner in which the first flexible printed circuit board 300 is disposed on the edge of the backlight module 200 and the bridging wire 400 is connected to both the first coil end 111 and the second coil end 112, it can be ensured that, the first flexible printed circuit board 300 is far away from the center of the backlight module 200 while effectively transmitting the NFC signal, thereby avoiding interference in work of the backlight module 200.

In some embodiments, the backlight module 200 further includes a light source component layer 220; the light source component layer 220 is disposed between the first insulation layer 250 and the NFC ferrite 120 and covers the bridging wire 400; and the backlight module 200 emits a first portion of light to the brightening layer 260.

The light source component layer 220 is a core component that is of the backlight module 200 and that can emit light. After the first portion of light emitted by the backlight module 200 is subjected to brightening treatment of the brightening layer 260, the light is emitted with increased brightness. In other words, the backlight module 200 achieves an objective of light emitting via the light source component layer 220, thereby implementing corresponding work.

Figure 4:
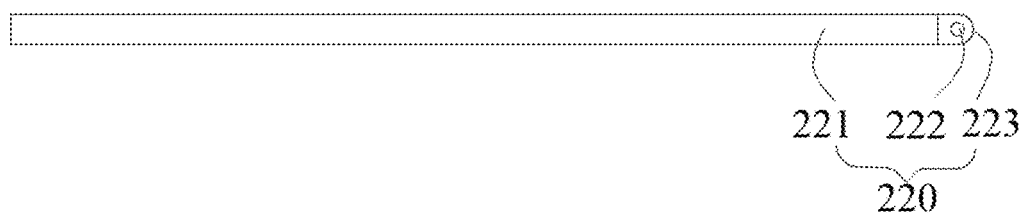
FIG. 4 is a structural diagram of a light source component layer according to an embodiment of this application.

As shown in FIG. 3 and FIG. 4, for a specific structure of the light source component layer 220, the light source component layer 220 may be provided with a light guide layer 221 and a light source 222. The light source 222 is disposed on a side of the light guide layer 221. The light source component layer 220 is superposed on the first insulation layer 250 through the light guide layer 221. Light emitted by the light source 222 is incident to the light guide layer 221. The first portion of light is emitted to the brightening layer 260 through the light guide layer 221. Because an overall area of the light guide layer 221 is greater than that of the light source 222, the light source component layer 220 finally emits light in a form of an area light source. This enables the light to be emitted more uniformly after passing through the light guide layer 221, thereby achieving a better light-emitting effect.

In some implementations, the light source component layer 220 may further include a reflection shell 223. The reflection shell 223 covers the light source 222 and is disposed opposite to the light guide layer 221. A reflection opening is disposed on a side of the reflection shell 223 facing the light guide layer 221. After being reflected by the reflection shell 223, the light emitted by the light source 222 is incident to the light guide layer 221 through the reflection opening.

In this way, different from light that is incident to the light guide layer 221 directly, the other portion of the light emitted by the light source 222 is incident to the light guide layer 221 through the reflection opening after being reflected by the reflection shell 223. Therefore, an amount of light that is incident to the light guide layer 221 is increased, thereby increasing brightness of light emitted from the light guide layer 221, and improving light utilization.

In some embodiments, the backlight module 200 may further include a reflection layer 210. The reflection layer 210 is superposed between the light source component layer 220 and the NFC ferrite 120. The light guide layer 221 emits a second portion of light to the reflection layer 210. The second portion of light is emitted towards the first portion of light after passing through the reflection layer 210. In this way, duo to the arrangement of the reflection layer 210, the second portion of light can be reflected in a light-emitting direction of the backlight module 200, that is, the first portion of light and the second portion of light converge and are emitted out in a same direction. This increases brightness of light emitted by the backlight module 200, and improves light utilization.

Still further, the backlight module 200 further includes a first protection layer 240. The first protection layer 240 is superposed between the first insulation layer 250 and the light source component layer 220. A first portion of the bridging wire 400 is disposed in the first insulation layer 250. A second portion of the bridging wire 400 is disposed in the first protection layer 240.

Herein, different materials may be selected for the first protection layer 240 according to different working scenarios. For example, an organic photoresist layer is used to prevent water and oxygen corrosion; or, the first protection layer 240 is made of the same material as the first insulation layer 250 to provide insulated protection.

Being partially disposed in the first insulation layer 250, the bridging wire 400 can be connected to the first coil end 111 while being spaced from the other portion of the NFC coil 110, so that the first insulation layer 250 can prevent a short circuit between the bridging wire 400 and the NFC coil 110. Because the first portion of the bridging wire 400 is disposed in the first insulation layer 250, and the second portion of the bridging wire 400 is disposed in the first protection layer 240, the bridging wire 400 can be embedded in space between the first insulation layer 250 and the first protection layer 240 to avoid occupation of superposing space of the backlight module 200 by the bridging wire 400. This further thins the display apparatus.

In some embodiments, as shown in FIG. 2 and FIG. 3, a first electrode slice 261 and a second electrode slice 262 are secured on a surface of the brightening layer 260 facing the first insulation layer 250. Insertion openings are formed between the first electrode slice 261 and the first protection layer 240 and between the second electrode slice 262 and the first protection layer 240. The first end of the first flexible printed circuit board 300 is inserted into the insertion opening and is electrically connected to the first electrode slice 261 and the second electrode slice 262. The first coil end 111 is electrically connected to the first electrode slice 261 through the bridging wire 400. The second coil end 112 is electrically connected to the second electrode slice 262.

In this way, the first electrode slice 261 and the second electrode slice 262 are used as intermediate transmission media. This further facilitates transmission, to the first flexible printed circuit board 300, of the signal generated by the NFC coil 110. Moreover, due to the design in which the insertion openings are formed between the first electrode slice 261 and the first protection layer 240 and between the second electrode slice 262 and the first protection layer 240, the first end of the first flexible printed circuit board 300 can be secured better. This further facilitates electrical connection of the first end of the first flexible printed circuit board 300 to the first electrode slice 261 and the second electrode slice 262. A second end of the first flexible printed circuit board 300 is used to electrically connect to a main board of an electronic device.

For specific materials, the first electrode slice 261 and the second electrode slice 262 may be both made of ITO, nano silver, TiAlTi, or the like. For a specific technological means, the first electrode slice 261 and the second electrode slice 262 may be attached to a surface of the brightening layer 260 via evaporation.

In some embodiments, as shown in FIG. 3, the backlight module 200 further includes a diffusion layer 230. The diffusion layer 230 is superposed between the light source component layer 220 and the first protection layer 240. The diffusion layer 230 is configured to diffuse light emitted by the light source component layer 220, so that the light can be emitted out more uniformly, thereby enhancing a light-emitting effect of the light source component layer 220.

Still further, as shown in FIG. 3, the first end of the first flexible printed circuit board 300 is overlapped and secured on the first electrode slice 261 and the second electrode slice 262; and colloid 500 is disposed between an end surface of the first protection layer 240 and the first flexible printed circuit board 300.

In this way, due to the design in which the first end of the first flexible printed circuit board 300 is inserted in the insertion opening and the design of the colloid 500, the first flexible printed circuit board 300 can be secured better, thereby enabling the first flexible printed circuit board 300 to be connected to the first electrode slice 261 and the second electrode slice 262 more stably. In addition, the colloid 500 can prevent the first end of the first flexible printed circuit board 300 from bending with a large angle, thereby protecting the first flexible printed circuit board 300. A lineation adhesive may be used in the colloid 500 as a binding material.

Still further, the NFC coil 110, the first electrode slice 261, and the second electrode slice 262 are disposed on a same layer. For example, all of them are disposed on a surface of the brightening layer 260 and in the first insulation layer 250, to improve space utilization. This further avoids occupation of the superposing space of the backlight module 200.

In some embodiments, as shown in FIG. 3, a surface of the NFC ferrite 120 facing the reflection layer 210 is a first end surface. The first end surface is provided with a convex ring 121. A projection of the NFC coil 110 on the first end surface is in a projection of the convex ring 121 on the first end surface. A surface, surrounding the NFC ferrite 120, in the convex ring 121 may be used as a receiving surface for the signal sent by the NFC coil 110. In addition, adding the convex ring 121 to a surface of the NFC ferrite 120 can further bunch magnetic flux, thereby improving strength and stability of the NFC signal.

In the display apparatus disclosed in this embodiment of this application, the backlight module 200 may further include a support frame. Generally, the support frame is an iron frame. The support frame can support another structure in the backlight module 200. In a further technical solution, the support frame is the NFC ferrite 120. In this case, the support frame and the NFC ferrite 120 are the same, so that the support frame of the backlight module 200 can be used for two purposes. This avoids a problem that a thickness is increased because more structures are stacked on the backlight module 200, thereby further facilitating design of a thinner display apparatus.

Herein, it should be further noted that a specific technological means of sequentially superposing the reflection layer 210, the light source component layer 220, the diffusion layer 230, the first protection layer 240, the first insulation layer 250, and the brightening layer 260 may be implemented via vapor deposition.

Based on the display apparatus disclosed in the embodiments of this application, an embodiment of this application discloses an electronic device. The disclosed electronic device includes the display apparatus described in the foregoing embodiments.

The electronic device in this embodiment of this application may be a phone, a tablet computer, an e-book reader, a wearable device (for example, a smartwatch or smart glasses), and the like. The embodiments of this application do not limit the specific type of the electronic device.

The foregoing descriptions are merely embodiments of this application, and are not intended to limit this application. Various changes and modifications may be made to this application by a person skilled in the art. Any modifications, equivalent substitutions, improvements, and the like made within the spirit and principle of this application should be included within the scope of the claims of this application.

What is claimed is:

1. A display apparatus, comprising a Near Field Communication (NFC) module and a backlight module, wherein:
   the NFC module comprises an NFC coil and an NFC ferrite;
   the backlight module comprises a first insulation layer and a brightening layer that are superposed sequentially; and
   the NFC coil is disposed on the brightening layer and is in the first insulation layer, and the NFC ferrite is disposed on a side of the first insulation layer away from the brightening layer, wherein the NFC coil is partially disposed in a display region and partially disposed in a non-display region of the backlight module, and the non-display region is disposed around the display region.

2. The display apparatus according to claim 1, wherein the NFC coil extends along an edge of the backlight module and forms a plurality of circles.

3. The display apparatus according to claim 2, wherein the backlight module further comprises a support frame, and the support frame is the NFC ferrite.

4. The display apparatus according to claim 1, wherein the NFC coil is transparent wire.

5. The display apparatus according to claim 1, wherein the NFC coil comprises a first coil end near a center of the backlight module and a second coil end near an edge of the backlight module, the display apparatus further comprises:
   a first flexible printed circuit board, wherein a first end of the first flexible printed circuit board is connected to the edge of the backlight module and is electrically connected to the second coil end, and the first coil end is electrically connected to the first flexible printed circuit board through bridging wire.

6. The display apparatus according to claim 5, wherein the backlight module further comprises a light source component layer, and the light source component layer is disposed between the first insulation layer and the NFC ferrite and covers the bridging wire; and
   the backlight module emits a first portion of light to the brightening layer.

7. The display apparatus according to claim 6, wherein the light source component layer comprises a light guide layer and a light source;
   the light source is disposed on a side of the light guide layer, and the light source component layer is superposed on the first insulation layer through the light guide layer; and
   a light emitted by the light source is incident to the light guide layer, and the first portion of light is emitted to the brightening layer through the light guide layer.

8. The display apparatus according to claim 7, wherein the light source component layer further comprises a reflection shell,
   wherein the reflection shell covers the light source and is disposed opposite to the light guide layer, and a reflection opening is disposed on a side of the reflection shell facing the light guide layer; and
   after being reflected by the reflection shell, the light emitted by the light source is incident to the light guide layer through the reflection opening.

9. The display apparatus according to claim 7, wherein the backlight module further comprises a reflection layer, and the reflection layer is superposed between the light source component layer and the NFC ferrite; and
   the light guide layer emits a second portion of light to the reflection layer, and the second portion of light is emitted towards the first portion of light after passing through the reflection layer.

10. The display apparatus according to claim 6, wherein the backlight module further comprises a first protection layer, and the first protection layer is superposed between the first insulation layer and the light source component layer; and
   a first portion of the bridging wire is disposed in the first insulation layer, and a second portion of the bridging wire is disposed in the first protection layer.

11. The display apparatus according to claim 10, wherein a first electrode slice and a second electrode slice are secured on a surface of the brightening layer facing the first insulation layer; and
   insertion openings are formed between the first electrode slice and the first protection layer and between the second electrode slice and the first protection layer, the first end of the first flexible printed circuit board is inserted into the insertion opening and is electrically connected to the first electrode slice and the second electrode slice, the first coil end is electrically connected to the first electrode slice through the bridging wire, and the second coil end is electrically connected to the second electrode slice.

12. The display apparatus according to claim 11, wherein the first end of the first flexible printed circuit board is overlapped and secured on the first electrode slice and the second electrode slice, and a colloid is disposed between an end surface of the first protection layer and the first flexible printed circuit board.

13. The display apparatus according to claim 11, wherein the NFC coil, the first electrode slice, and the second electrode slice are disposed on a same layer.

14. The display apparatus according to claim 10, wherein the backlight module further comprises a diffusion layer, and the diffusion layer is superposed between the light source component layer and the first protection layer.

15. An electronic device, comprising a display apparatus, wherein the display apparatus comprises a Near Field Communication (NFC) module and a backlight module, wherein:
   the NFC module comprises an NFC coil and an NFC ferrite;
   the backlight module comprises a first insulation layer and a brightening layer that are superposed sequentially; and
   the NFC coil is disposed on the brightening layer and is in the first insulation layer, and the NFC ferrite is disposed on a side of the first insulation layer away from the brightening layer,
   wherein the NFC coil is partially disposed in a display region and partially disposed in a non-display region of the backlight module, and the non-display region is disposed around the display region.

16. The electronic device according to claim 15, wherein the NFC coil extends along an edge of the backlight module and forms a plurality of circles.

17. The electronic device according to claim 15, wherein the NFC coil is transparent wire.

18. The electronic device according to claim 15, wherein the NFC coil comprises a first coil end near a center of the backlight module and a second coil end near an edge of the backlight module, the display apparatus further comprises:
   a first flexible printed circuit board, wherein a first end of the first flexible printed circuit board is connected to the edge of the backlight module and is electrically connected to the second coil end, and the first coil end is electrically connected to the first flexible printed circuit board through bridging wire.

19. The electronic device according to claim 18, wherein the backlight module further comprises a light source component layer, and the light source component layer is disposed between the first insulation layer and the NFC ferrite and covers the bridging wire; and
   the backlight module emits a first portion of light to the brightening layer.

20. The electronic device according to claim 19, wherein the light source component layer comprises a light guide layer and a light source;
- the light source is disposed on a side of the light guide layer, and the light source component layer is superposed on the first insulation layer through the light guide layer; and
- a light emitted by the light source is incident to the light guide layer, and the first portion of light is emitted to the brightening layer through the light guide layer.

* * * * *